United States Patent
Morin et al.

(10) Patent No.: US 8,806,623 B2
(45) Date of Patent: Aug. 12, 2014

(54) MICROCIRCUIT CARD PROTECTED BY A FUSE

(75) Inventors: Nicolas Morin, Levallois Perret (FR); Christophe Giraud, Levallois Perret (FR)

(73) Assignee: Oberthur Technologies, Levallois Perret (FR)

(*) Notice: Subject to any disclaimer, the term of this patent is extended or adjusted under 35 U.S.C. 154(b) by 0 days.

(21) Appl. No.: 13/324,477

(22) Filed: Dec. 13, 2011

(65) Prior Publication Data
US 2013/0117844 A1 May 9, 2013

(30) Foreign Application Priority Data

Dec. 14, 2010 (FR) .................................... 10 60464

(51) Int. Cl.
*G06F 21/55* (2013.01)

(52) U.S. Cl.
USPC ........................................... 726/22; 327/525

(58) Field of Classification Search
USPC .......... 726/22, 34–36; 713/330–340; 327/525
See application file for complete search history.

(56) References Cited

U.S. PATENT DOCUMENTS

| | | | | |
|---|---|---|---|---|
| 4,937,465 | A * | 6/1990 | Johnson et al. | 327/525 |
| 6,264,108 | B1 * | 7/2001 | Baentsch | 235/487 |
| 6,268,760 | B1 | 7/2001 | Marshall et al. | |
| 2001/0026184 | A1 * | 10/2001 | Marshall et al. | 327/525 |

FOREIGN PATENT DOCUMENTS

| | | |
|---|---|---|
| EP | 2 164 053 A1 | 3/2010 |
| FR | 2 513 408 A1 | 3/1983 |

* cited by examiner

*Primary Examiner* — Jeffrey Pwu
*Assistant Examiner* — Samuel Ambaye
(74) *Attorney, Agent, or Firm* — Arent Fox LLP

(57) ABSTRACT

A microcircuit card (200) includes means for detecting an attack on the card, and command means (130) capable of blowing a fuse (250) of the card when an attack is detected.

9 Claims, 1 Drawing Sheet

MICROCIRCUIT CARD PROTECTED BY A FUSE

BACKGROUND OF THE INVENTION

The present invention is situated in the field of protection of electronic modules.

It applies especially, but without limitation, to the protection of a microcircuit card, for example one complying with the ISO 7816 standard.

Within the scope of protection of microcircuit cards against fault injection attacks, a known countermeasure is to write a predetermined value into a reserved area of a nonvolatile memory of the card that is writable only once, known to the person skilled in the art by the acronym OTP (One Time Programmable).

The invention addresses an alternative solution.

OBJECT AND SUMMARY OF THE INVENTION

More precisely, the invention relates to a module including:
means for detecting an attack on this module; and
command means capable of blowing a fuse of the module when an attack is detected.

In a particular embodiment of the invention, the command means are capable of commanding the charging of a capacitor during normal operation (that is to say, when no attack is detected) and to command the discharging of this capacitor for blowing the fuse when an attack is detected.

The blowing of this fuse physically prevents the card from operating.

Thanks to the invention, an attacker is not able to prevent the destruction of the fuse.

In a particular embodiment of the invention, the module includes a NOT gate connected in series with the fuse, the output of this gate being a control signal the level whereof is high during normal operation and low when an attack is detected, this control signal being used to maintain a vital signal of the module when an attack is detected.

This vital signal can be selected from among a reset signal, a clock signal or an input/output signal connected with equipment external to the module.

In a particular embodiment, the module includes, at the output of the fuse, a control signal capable of controlling a switch controlling the power supply to a component vital to the module.

This component can consist of a processor.

The switch can be a PMOS transistor.

In a particular embodiment, the module according to the invention consists of a microcircuit card complying with the ISO 7816 standard.

BRIEF DESCRIPTION OF DRAWINGS

Other features and advantages of the present invention will appear from the description given below with reference to the appended drawing which illustrates two embodiments which are devoid of any limiting character.

DETAILED DESCRIPTION OF THE INVENTION

Figure 1:
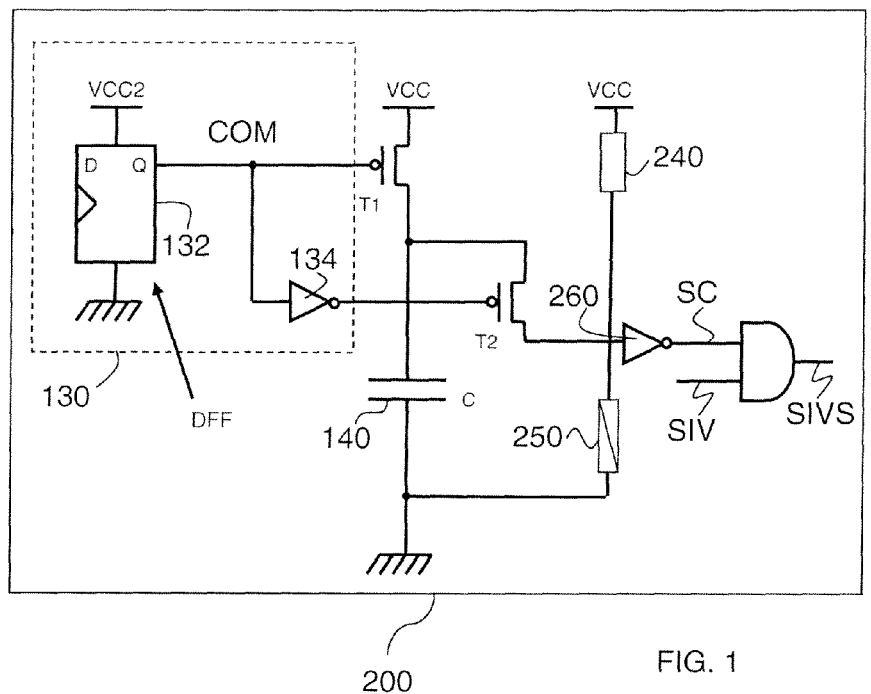
FIG. 1 illustrates a module 200 conforming to a first embodiment of the invention.

FIG. 1 shows a module 200 conforming to a first embodiment of the invention.

This module consists in this example of a microcircuit card complying with the ISO 7816 standard.

This microcircuit card is capable of flipping a control signal SC from a high level during normal operation to a low level when an attack is detected on the microcircuit card 200. Such an attack can for example be detected by carrying out an operation twice and comparing the corresponding outputs, but the detection of the proper attack is not the object of the invention.

The microcircuit card 200 includes means 130 capable of generating a command COM at a first level during normal operation (low level NB), and at a second level when an attack is detected (high level NH).

In the embodiment described here, these command means include a D flip-flop 132 and a NOT gate 134. The D flip-flop 132 corresponds to a bit which commands the flipping of the control signal SC.

In other words, in this example, the detection of an attack results in flipping the output of the D flip-flop 132 from low level (NB) to high level (NH).

The microcircuit card includes a capacitor 140 supplied with power during normal operation by a voltage VCC.

In the embodiment described here, one lead of the capacitor 140 is connected to a switch T1 which is conducting during normal operation, so as to be able to charge the capacitor. This switch T1 consists of a PMOS transistor directly connected to the output of the D flip-flop 132, at low level (NB) during normal operation.

The capacitor 140 thus stores energy during the normal operation of the microcircuit card 200, that is outside the context of detection of an attack.

In conformity with the invention, the microcircuit card 200 includes a fuse 250 designed to be blown, when an attack is detected, by discharging the capacitor 140.

More precisely, in this embodiment, the command means 130 of the microcircuit card 200 are capable of allowing:
charging of the capacitor 140 during normal operation; and
discharging of the capacitor 140 for blowing the fuse 250 of the card when an attack is detected.

It is recalled that a fuse has the role of opening an electrical circuit when the current passing through it reaches a certain threshold; once the fuse is blown, no current can pass through it.

In the embodiment described here, the fuse 150 is connected to a switch T2 controlled by the command means 130 so as to be non-conducting in normal operation and conducting when an attack is detected.

In the embodiment described here, the switch T2 is a PMOS transistor connected, via a NOT gate 134, to the output of the D flip-flop 132.

When an attack is detected, the output of the command means 130 flips to the high state and the switch T2 becomes conducting, so that the capacitor discharges into the fuse 250.

In this embodiment, this operation is considered to be sufficiently quick than an attack aimed at cutting off power supply to the command means 130 would be ineffective.

The capacitor 140 is sized so as to blow the fuse 250 when the capacitor is discharged, the switch T2 having become conducting.

Thanks to the invention, and very advantageously, the discharge of the capacitor 140 is not detectable by analysis of the power consumption of the microcircuit card.

The fact of blowing the fuse 250, when an attack is detected, causes the control signal SC to flip from a high level (NH) in normal operation to a low level (NB).

To this end, a microcircuit card 200 includes a NOT gate 260, connected in series with the fuse 250, the output of this NOT gate 260 constituting said control signal SC, the level of this signal being high (NH) in normal operation and low (NB) when an attack is detected.

In the embodiment of FIG. 1, a resistor 240 imposes a high signal at the input of the NOT gate 260, and hence a low level signal at its output, when the fuse 250 is blown.

In the embodiment of FIG. 1, the control signal SC, at the output of the inverting gate 260, is used to maintain a signal SIV vital to the proper operation of the microcircuit card 200 by combination of these signals SC, SIV by means of an AND gate.

This vital signal can for example be selected from among a reset signal (RESET), a clock signal (CLOCK), or an input/output signal connected with a reader of said microcircuit card.

The signal SIVS resulting from this logical AND is therefore a signal secured by the invention.

Figure 2:
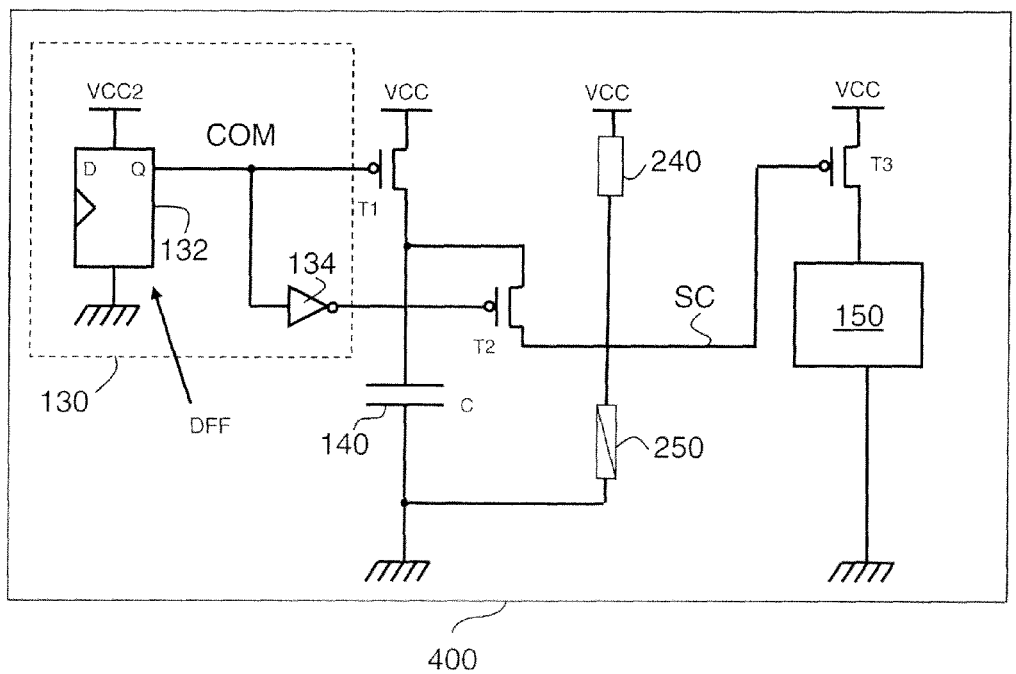
FIG. 2 illustrates a microcircuit card 400 conforming to a second embodiment of the invention.

FIG. 2 shows a microcircuit card 400 conforming to a second embodiment of the invention.

In this figure, the elements of the microcircuit card 400 that are similar to those of the microcircuit card 200 have the same reference symbols as those of FIG. 1.

In the embodiment of FIG. 2, the fact of blowing the fuse 250, when an attack is detected, causes a control signal SC to flip from a low level (NB) in normal operation to a high level (NH).

The microcircuit card 400 does not include any NOT gate 260, the control signal SC at the output of the fuse 250 commanding a switch capable of cutting off the power supply to a vital component of the card, to with in this example, that of a processor 150.

In the embodiment described here, this switch consists of a PMOS transistor T3.

More precisely, in the embodiment of FIG. 2, the microcircuit card 400 includes a transistor T3 controlled by the control signal SC such that:
in normal operation, the control signal SC is at a low level, and the CPU 150 is supplied with power by the voltage VCC; and
in the event of detection of an attack, the fuse 250 blows, the control signal flips to a high level and the CPU 150 is no longer supplied with power.

The invention claimed is:

1. A module including:
   means for detecting an attack on said module; and
   command means for enabling to blow a fuse of said module when an attack is detected,
   wherein said command means are able to command the charging of a capacitor during normal operation and commanding the discharging of said capacitor to blow said fuse when an attack is detected.

2. A module according to claim 1, characterized in that it includes a NOT gate connected in series with said fuse, the output of this NOT gate being a control signal the level whereof is high in normal operation and low when an attack is detected; said control signal is used to maintain a vital signal of said module when an attack has been detected.

3. A module according to claim 2, characterized in that said vital signal is selected from among a reset signal, a clock signal or an input/output signal connected with equipment external to said module.

4. A module according to claim 1, characterized in that it includes, at the output of said fuse, a control signal capable of commanding a switch controlling the power supply to a vital component of said module.

5. A module according to claim 4, characterized in that said switch is a PMOS transistor.

6. A module according to claim 4, characterized in that said vital component is a processor.

7. A module according to claim 1, consisting of a microcircuit card complying with the ISO 7816 standard.

8. The module of claim 7, wherein the blowing of the fuse physically prevents the microcircuit card from operating.

9. The module according to claim 4, wherein the control signal is used to maintain a signal vital to the proper operation of the microcircuit card by combination of the control signal and the signal vital to the proper operation of the microcircuit card via an AND gate.

* * * * *